United States Patent
Hilden et al.

(10) Patent No.: US 9,577,888 B2
(45) Date of Patent: Feb. 21, 2017

(54) METHOD AND APPARATUS FOR VERIFYING AND MANAGING A CLIENT SYSTEM NETWORK AND NETWORK DEVICES

(71) Applicant: Verizon Patent and Licensing Inc., Arlington, VA (US)

(72) Inventors: Michael Hilden, Richardson, TX (US); Donna G. McCarty, Red Oak, TX (US); John H. Evans, Allen, TX (US); Stephen R. Smith, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 253 days.

(21) Appl. No.: 14/466,633

(22) Filed: Aug. 22, 2014

(65) Prior Publication Data
US 2016/0057012 A1 Feb. 25, 2016

(51) Int. Cl.
*G06F 15/173* (2006.01)
*H04L 12/24* (2006.01)

(52) U.S. Cl.
CPC ....... *H04L 41/0853* (2013.01); *H04L 41/0869* (2013.01); *H04L 41/082* (2013.01)

(58) Field of Classification Search
None
See application file for complete search history.

(56) References Cited

U.S. PATENT DOCUMENTS

| | | | |
|---|---|---|---|
| 2006/0277383 A1* | 12/2006 | Hayden | H04L 69/14 711/170 |
| 2009/0239518 A1* | 9/2009 | Feuillette | H04L 41/082 455/418 |
| 2014/0325278 A1* | 10/2014 | Omar | G06F 11/263 714/33 |

\* cited by examiner

*Primary Examiner* — John B Walsh

(57) ABSTRACT

An approach is provided for managing and verifying configuration of a client network and the network devices by assessing or sharing network/device information. The approach includes querying a client system to determine one or more information items associated with a network and one or more network devices in the client system. The approach further includes generating a verified profile for the network and the one or more network devices. The approach also includes analyzing a modification in an active profile associated with the network and the one or more network devices. Further, the approach includes initiating an update to the verified profile or to the active profile based on a validation of the modification.

20 Claims, 12 Drawing Sheets

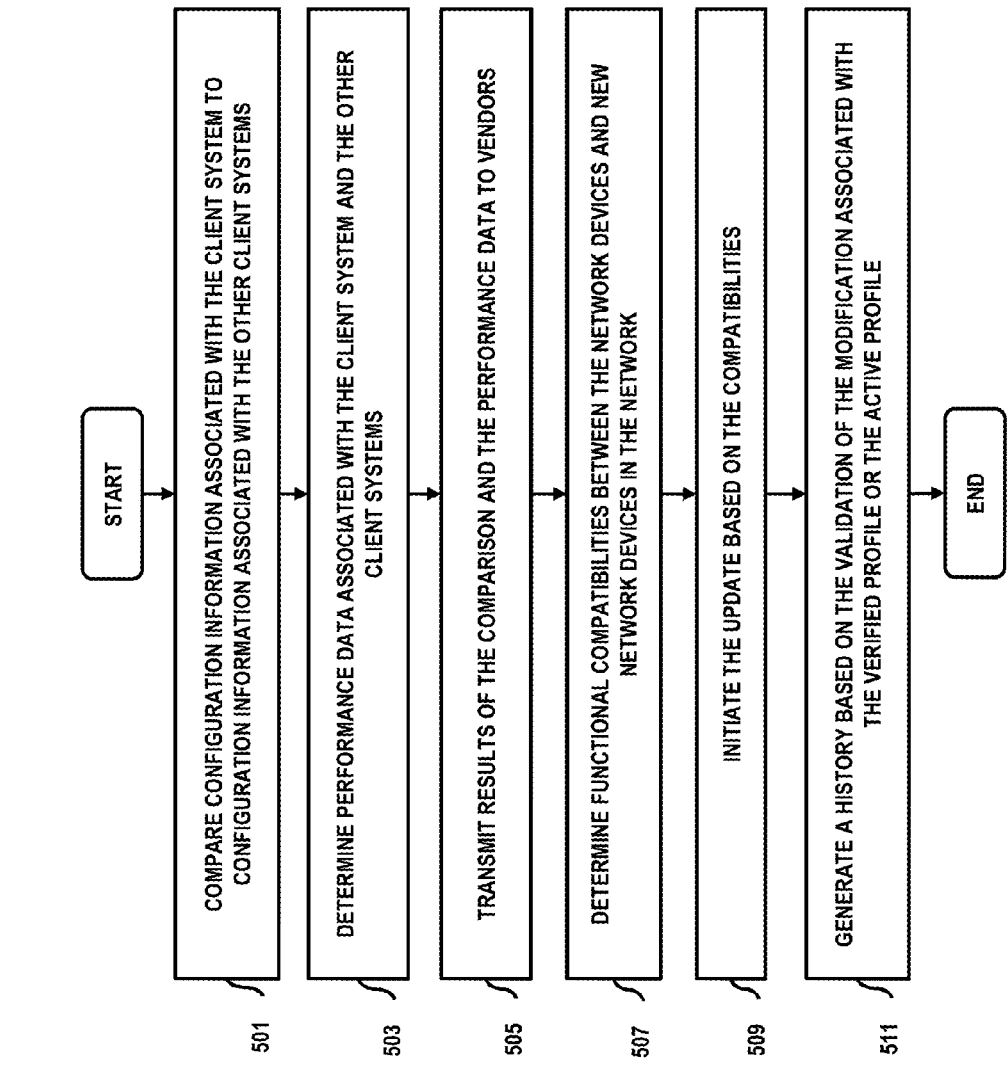

Client System- City Center Bank

| Device | Device Type | Version | ID | IP Address | Location |
|---|---|---|---|---|---|
| 117a | Network Server | 1.5 | SRVR | 192.12.345.67 | Main Office |
| 117b | TX/RX Station | 3.0 | TR | 193.35.567.90 | Main Office |
| 117c | Satellite TX/RX | 2.4 | STR | 194.00.56.10 | City Center Office |
| 117d | Admin IT | 5.0 | ADMN | 195.333.56.01 | Capital Building |

METHOD AND APPARATUS FOR VERIFYING AND MANAGING A CLIENT SYSTEM NETWORK AND NETWORK DEVICES

BACKGROUND INFORMATION

With an expansion in the types and number of devices/equipment that customers/clients utilize in their communication or computing systems/networks, it is becoming increasingly more challenging for service providers to manage or verify proper functionality or configuration of the client networks and devices. Often times, the networks include devices by various vendors, where the devices may be configured with unique hardware, software, firmware, etc. Additionally, some of the client networks may be configured differently and according to the clients' use or specifications. In some cases, a service provider may manage/implement similar networks for different clients, where the networks may include same/similar devices. In other scenarios, different vendors of the network devices may utilize different hardware, software, firmware, etc. to provide the same/similar functionality in a client network. Moreover, in some situations, a service provider implementing/managing a client network, the client network, and the vendors associated with the network and its devices may not have the most recent or may not be readily sharing information associated with the performance, configuration, or status of a client network and its devices.

Based on the foregoing, there is a need for managing and verifying configuration of a client network and the network devices by assessing or sharing network/device information.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3 through 5 are flowcharts of processes for managing and verifying configuration of a client network and the network devices by assessing or sharing network/device information, according to various embodiments;

DESCRIPTION OF THE PREFERRED EMBODIMENT

An apparatus, method and software for managing and verifying configuration of a client network and the network devices by assessing or sharing network/device information. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described for managing and verifying configuration of a client network and the network devices by assessing or sharing network/device information, it is contemplated that these embodiments have applicability to a variety of devices, applications, or services where various functionalities or information associated with various devices in a network may be monitored, queried, or managed by one or more entities in associated with the devices or the network.

Figure 1:
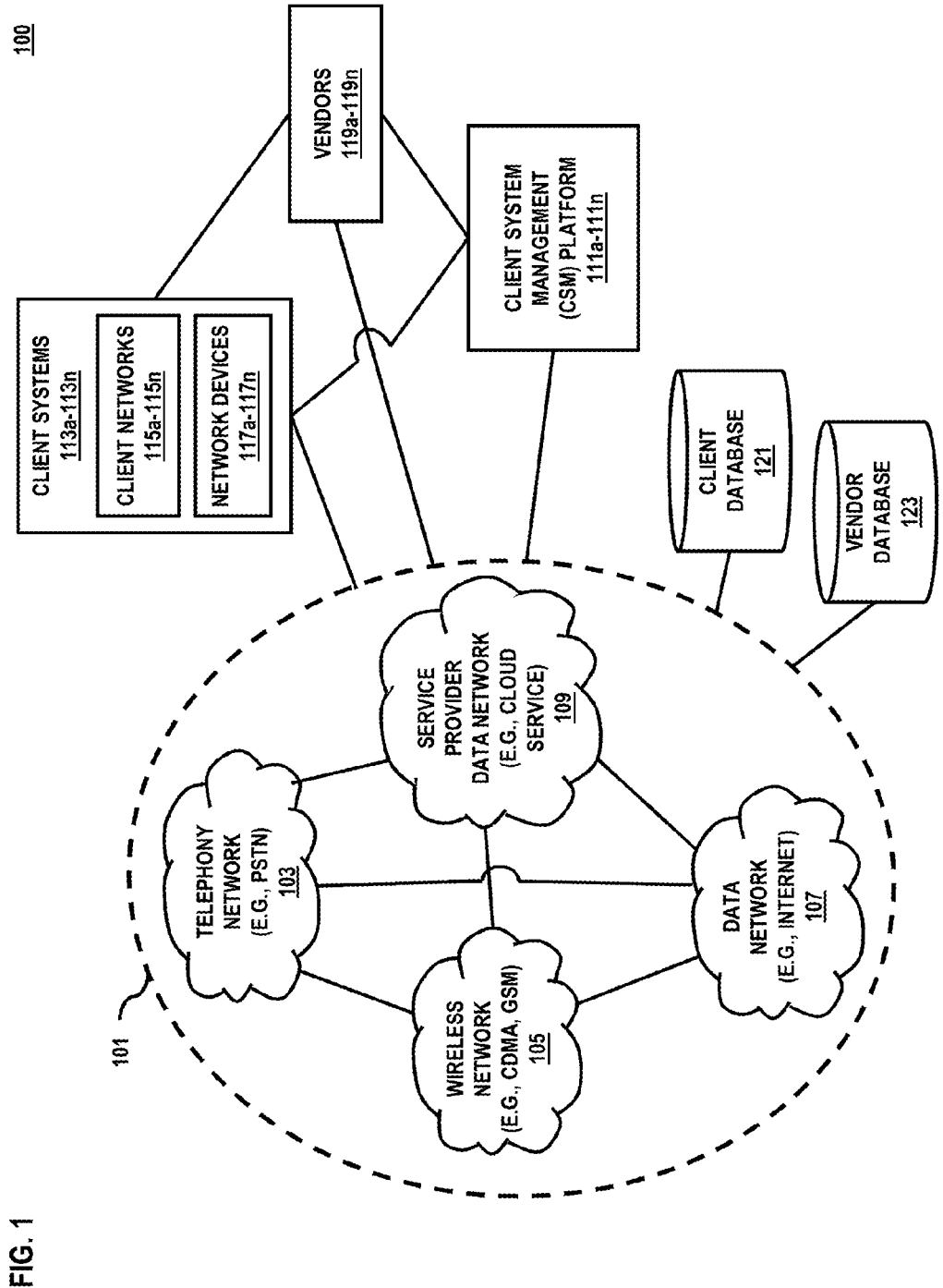
FIG. 1 is a diagram of a system capable of managing and verifying configuration of a client network and the network devices by assessing or sharing network/device information, according to one embodiment.

FIG. 1 is a diagram of a system for managing and verifying configuration of a client network and the network devices by assessing or sharing network/device information. Generally, various service providers implement and provide communication or computing networks for use by various clients; for example, to communicate with others, access/transfer contents, access computing servers, or the like. In some scenarios, a service provider or a client may implement a client network, which may be dedicated for use or control by the client. For example, a client network may be a company communication or computing network to provide communication services, navigation services, online shopping, social networking services (e.g., blogging), content sharing, education, entertainment, media upload, media download, media streaming, account management, or the like services. In various examples, the network devices may include wireless or wired devices that may be by one or more vendors, which may be implemented, managed, or verified by a service provider. As noted, client networks may include a range of different devices and configurations as well as different versions of the devices and configurations. For example, a service provider may manage two different client intranet networks for two different clients, wherein the networks may include different servers, routers, applications, firmware, or the like. Additionally, a service provider, a client, or a vendor associated with a client network may request for or cause a medication of the client network; for instance, by updating the network configuration profile, adding/removing network devices, changing configuration of a network device, or the like. However, at times, the modifications may be done by a client or a vendor, where a service provider associated with the network (e.g., managing) may not be aware of the modifications. For example, a vendor may update hardware/software/firmware of a server used in a client network without notifying a service provider that may be responsible for managing the client network. Moreover, a service provider may have access to information about client networks or network devices that vendors associated with the networks or network devices may be unaware of Therefore, there is a need for managing and verifying configuration of a client network and the network devices by assessing or sharing network/device information.

To address these issues, system 100 of FIG. 1 provides the capability for managing and verifying configuration of a client network and the network devices by assessing or sharing network/device information. In some implementations, a service provider may be managing client networks that include a variety of network devices or customer-premise equipment (CPE) that may be by one or more vendors. It would be advantageous for the service provider to have access to information about the client networks, network devices, configurations of the networks and the devices, vendors of the devices, or the like information. In some use cases, a service provider may share information about the networks, network devices, performance of the network/devices, or the like information with vendors that may be associated with the network/devices. In one scenario, a service provider or a vendor may analyze configuration and performance information of a network and its devices to determine a verified (e.g., "Golden") configuration, which later may be referred to; for example, when there are changes to the network/devices or performance associated with the network/devices.

In one scenario where a customer system may include various types of equipment that are of various versions and from a plurality of vendors, a service provider may query or have access to information about the types, versions, and vendors of the equipment. For example, the service provider may request for the information from the customer, vendor, or another party that may have the information. In one example, the service provider may cooperate with a vendor to create a verified configuration for the equipment. Further, the vendor may provide information on any updates to its equipment (e.g., hardware, software, firmware, etc.) Additionally, the service provider or the vendor may create a history of any issues or performance information about the equipment. In one embodiment, a service provider may provide, to a vendor, configuration and performance information about CPE that are associated with that vendor, where the information may include real time analysis on the CPE. In one example, a service provider proactively can identify any customer equipment that may be associated with known updates, issues, etc. In one example, a "Golden configuration" for related equipment may include information for optimal performance or standardization of customer systems.

In one embodiment, information about a particular customer system may be communicated (e.g., broadcast message) to other customer systems that are the same or similar to the customer system. In one scenario, a service provider may analyze a new customer system to identify system devices and related information; for example, type, make, model, Internet protocol (IP) address, or the like. Further, the service provider may query configuration information for the new customer system and its devices; for example, hardware, software, firmware, history logs, etc., wherein the configuration information may be compared to other known and verified configuration information of other customers with the same/similar system.

In some situations, a service provider may provide any relevant CPE information to one or more other service providers (e.g., repair or maintenance teams) for accessing and servicing (e.g., software/hardware/firmware) the CPE. In one embodiment, a service provider may transmit one or more alert notifications to a vendor or a customer associated with a CPE, and provide information about one or more system related issues or topics; for example, known outages, new software release or patch, IP security (IPSec) tunnel outage, equipment & release timeout, equipment no longer supported, faulty module/card, or the like information. In one embodiment, a service provider may determine and present one or more options to address a pending alert notification.

For the purpose of illustration, the system 100 may include a network system 101, which may include one or more networks, including a telephony network 103, a wireless network 105, a data network 107, a service provider data network 109, or the like system elements. By way of example, the networks 103, 105, 107, and 109 may be any suitable wireline and/or wireless network, which may be managed by one or more service providers. In one example, the networks 103, 105, 107, and 109 may be one or more elements in the network system 101, which may include various components and elements for providing a range of communication and network services. For example, the telephony network 103 may include a circuit-switched network, such as the public switched telephone network (PSTN), an integrated services digital network (ISDN), a private branch exchange (PBX), or other like network. The wireless network 105 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, the data network 107 may be any local area network (LAN), metropolitan area network (MAN), wide area network (WAN), the Internet, or any other suitable packet-switched network, such as a commercially owned, proprietary packet-switched network, such as a proprietary cable or fiber-optic network. By way of example, a service provider 109 may provide any number of services (e.g., mapping services, social networking services, media services, content services, device management services, etc.) via a web server or other means of communications (e.g., text messaging, voice, instant messaging, chat, etc.)

Additionally, the system 100 may include one or more client system management (CSM) platforms 111a-111n (CSM platform or CSM platform 111), which may be implemented as a standalone or as an integrated component of the network system 101, for example in a service provider 109, for managing and verifying configuration of client systems 113a-113n (client system or client system 113), which may include client networks 115a-115n (client network 115) and network devices 117a-117n (network devices 117), by accessing or sharing network/device information with clients systems 113 or vendors 119a-119n (vendors 119) associated with the client networks 115 and the network devices 117.

In one embodiment, the CSM platform 111 may query or access information about the client networks, network devices, configurations of the networks and the devices, vendors of the devices, or the like. In one scenario, a CSM platform may analyze configuration and performance information of a network and its devices to determine a verified configuration, which later may be referred to; for example, when there are changes to the network/devices or performance associated with the network/devices. In one embodiment, the CSM platform may analyze updates or configuration information that may be available from one or more vendors before the updates or configuration information are implemented into a client system. For example, the CSM platform may analyze a firmware update to a network device 117 before the firmware is downloaded into the network device.

Further, the system 100 may include client(s) database 121 and vendor(s) database 123 which may be accessible to the CSM platforms, the client systems, or the vendors. In one embodiment, the client database may include information about an entity an owner, a user, an enterprise, or the like that may have a controlling interest over a client system 113. Additionally, the client database may include guidelines, policies, directives, or the like information, which may be utilized to manage a client system 113. Moreover, the client database may include information about the clients system 113 including details about the client networks 115, the network devices 117, and any configuration information associated therewith. In one scenario, the vendor database 123 may include information about various vendors and their products or services that may be associated with various client systems, the client networks, and the network devices. Additionally, the vendor database 123 may include update or configuration information for the client systems 113 and associated network or network devices. Further, a CSM platform may provide client system feedback information to a vendor via the vendor database. For example, a CSM platform may determine information about a certain network device in a client system and input that information into the vendor database 123, where vendors associated with that network device may access, analyze, or utilize that information.

Although depicted as separate entities, the networks 103, 105, 107, and 109, the CSM platform 111, or the client system 113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 103, 105, 107, and 109 may include components and facilities to provide for signaling and/or bearer communications between the various components or facilities of system 100. In this manner, networks 103, 105, 107, and 109 may embody or include portions of a signaling system 7 (SS7) network, or other suitable infrastructure to support control and signaling functions.

By way of examples, the client networks 115 may include wireless or wired WANs as well as LANs for Bluetooth signaling, near field communication (NFC) signals, RFID signals, or the like. Further, the network devices 117 may include various wired or wireless devices to effectuate functionalities of the client systems 113. For example, the network devices may include servers, signal transmitters and receivers (e.g., for cellular, satellite, Internet, LAN, WAN, etc.), antennas, or the like. Additionally, the client system 113 may include various software or applications for effectuating one or more functions at the client systems 113. For example, applications for online product sales, content consumption, time management, online consumer account management, or the like.

Figure 2:
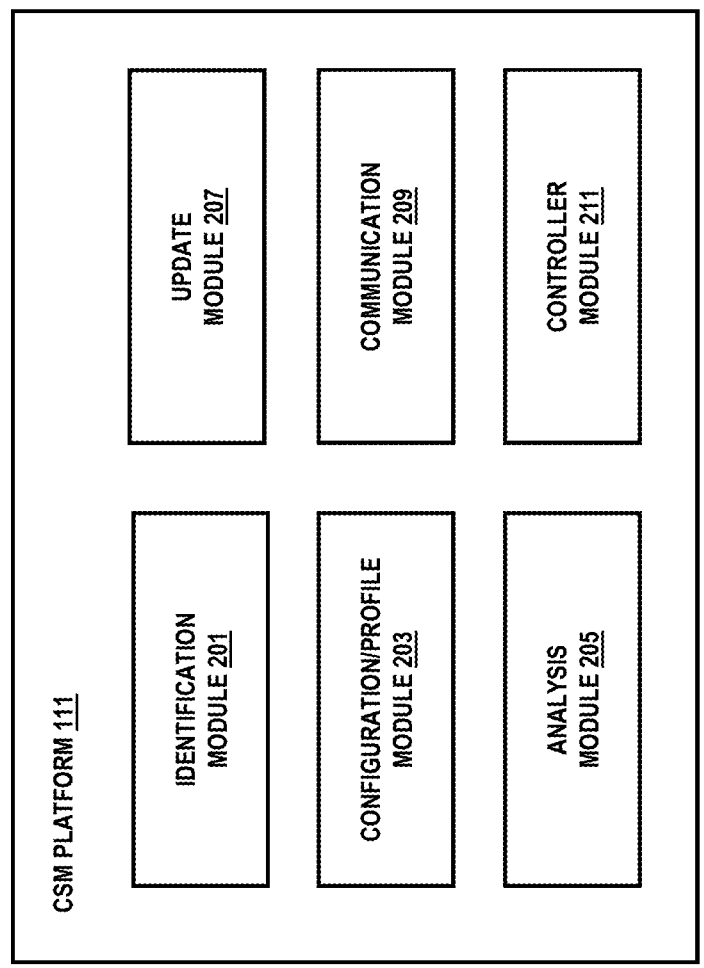
FIG. 2 is a diagram of the components of a client system management platform, according to one embodiment.

FIG. 2 is a diagram of the components of a CSM platform, according to one embodiment. The CSM platform 111 may include various executable modules for performing one or more computing, data processing or network based instructions that in combination provide a means of managing and verifying configuration of a client network and the network devices by assessing or sharing network/device information. Such modules can be implemented in hardware, firmware, software, or a combination thereof. By way of example, a CSM platform 111 may include an identification module 201, configuration/profile module 203, analysis module 205, update module 207, communication module 209, and a controller module 211.

In one embodiment, an identification module 201 may query a client system to determine one or more information items associated with a network and one or more network devices in the client system. In one embodiment, the identification module may access a client system to determine information about the client system and possible networks, sub-networks, and network devices that may be associated with that system. In various scenarios, the query may be initiated based on a service request from the client, a service agreement between the service provider and the client, a request from a vendor that is associated with the client system, or the like. In one scenario, the information may include identification information, IP address, operating parameters, configuration information, system architecture specification, associated vendors, or the like about the network or the network devices. Further, the identification module may utilize the information items to determine additional information that may be available from one or more vendors or databases. Additionally, the one or more information items may indicate versions of the network devices and their software/hardware/firmware. In one embodiment, the identification module may process the information items to determine status information of a network device, geographic location information, description information (e.g., a type of device), service history information (e.g., types, dates, etc.), available resources, or the like that may be associated with the network devices.

In one embodiment, a configuration/profile module 203 may generate a verified profile for the network and the one or more network devices. In one example, a profile may include various configuration or architecture information associated with the client, system type, target use, networks, network devices, or the like. In one scenario, the configuration/profile module may determine, from the client system, configuration information for the networks and the network devices. Further, the configuration/profile module may request or determine additional configuration information from one or more vendors that may be associated with the networks and the network devices in the client system. In one embodiment, the configuration/profile module may utilize the configuration information from the client system, the additional configuration information from the vendors, and information specific to the client system to generate a verified profile for the networks and the network devices. In one embodiment, the configuration/profile module may compare one or more configurations for the client system to generate the verified profile. In one example, the configuration/profile module may utilize a verified profile of a first client system to generate a verified profile for another client system, which may include the same or similar network, network devices, system architecture, etc. as that of the first client system.

In one embodiment, an analysis module 205 may analyze a modification in an active profile associated with the network and the one or more network devices. In one example, an active profile may include current configuration and parameters that are in use in a client system to effectuate performance of one or more networks and network devices in the system. In one embodiment, the analysis module may monitor the client system and analyze any changes to the networks or the network devices. For instance, determine that there are one or more modifications to the network coverage and to one or more software/hardware/firmware of one or more network devices in the client system. In various scenarios, the modifications may be done by a client, a user, an administrator, one or more vendors, etc. that are associated with the client system. For example, at a client system, an administrator may update a certain software on a server and client system, or a vendor may upgrade one or more modules at network device, or a user may install a new application on a test equipment, or the like.

In one embodiment, an update module 207 may initiate an update to the verified profile or to the active profile based on a validation of the modification. In one embodiment, the update module may analyze system performance information to determine the validity of the one or more modifications in the client system. In one example, the update module may query the performance information from each network device for determining the impact of the one or more modifications in the client system. In another example, the update module may analyze the performance of the entire client system to determine whether the one or more modifications have, positively/negatively, impacted the performance of the system. In one embodiment, the update module may request or query for authorization information associated with each modification detected in the client system. For instance, to determine whether a patch to a system-level software was done by a client or a system administrator. In one embodiment, if the results of the analysis of the modifications indicate a beneficial/positive/expected/acceptable impact to the client system, then the update module may initiate an update to a verified profile associated with the client system. However, if the results of the analysis of the modifications indicate a negative/unacceptable impact to the client system, then the update module may initiate an update to a current active profile associated with the client system. For example, the update module may utilize all or portions of a verified profile to update all or portions of an active profile in the client system.

In one embodiment, a communication module 209 may be utilized to communicate with various applications, modules, or components at a CSM platform, another CSM platform, a client system, a vendor, or with one or more entities of the system 100 for presenting or receiving information, messages, or the like associated with a CSM platform communications or services. In one embodiment, the communication module 209 may utilize one or more communication channels to communicate one or more messages, network or network device identification information, command messages, inquiry messages, or the like associated with a client system 113. By way of example, the communication module 209 executes various protocols and data sharing techniques for enabling collaborative execution between a CSM platform 111, a client system 113, a vendor 119, or the like.

In one embodiment, a controller module 211 may be configured to operate and effectuate the processes by or at other modules of the CSM platform 111. For example, the controller module 211 may generate the appropriate signals to control the communication module 209 and the update module 207 for facilitating a transmission of an update message or an alert notification to one or more client systems or vendors over the network system 107. Additionally, the controller module may cause, initiate, or execute one or more processes, algorithms, applications, software, or the like for effectuating one or more functions at the CSM platform 111.

Figure 3:
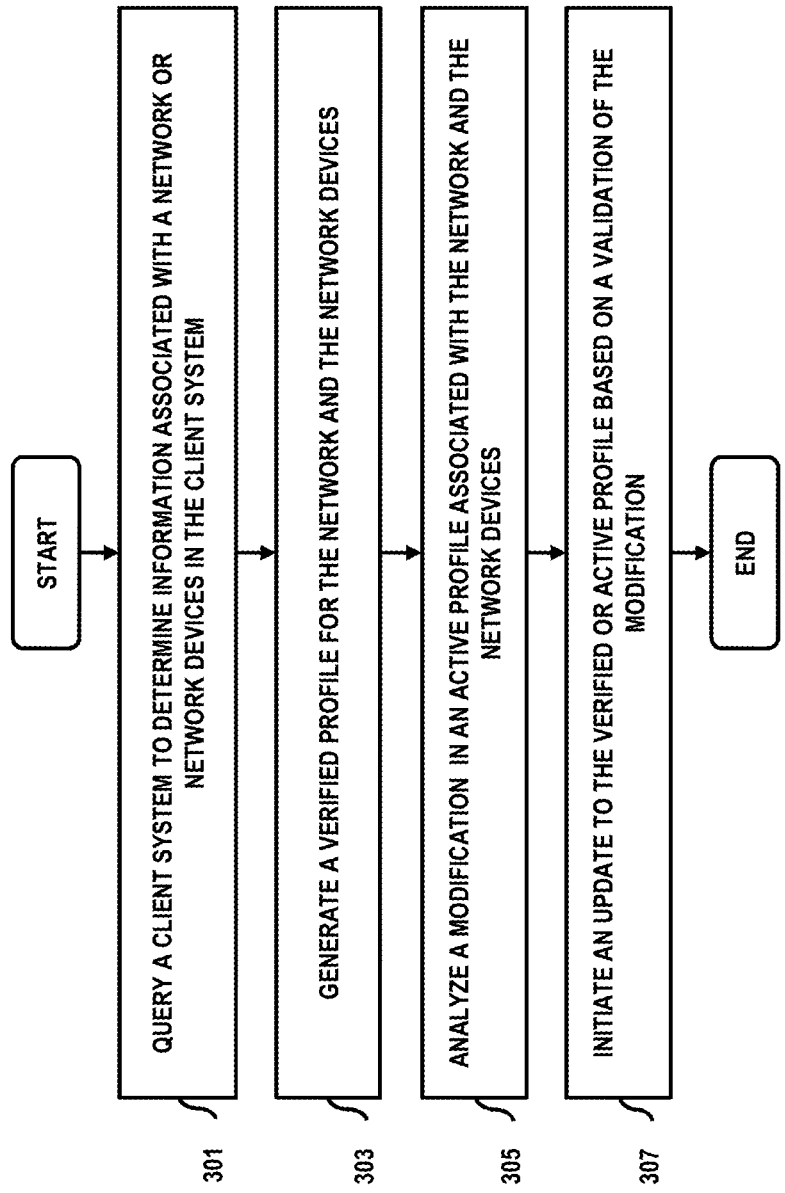
Figure 4:
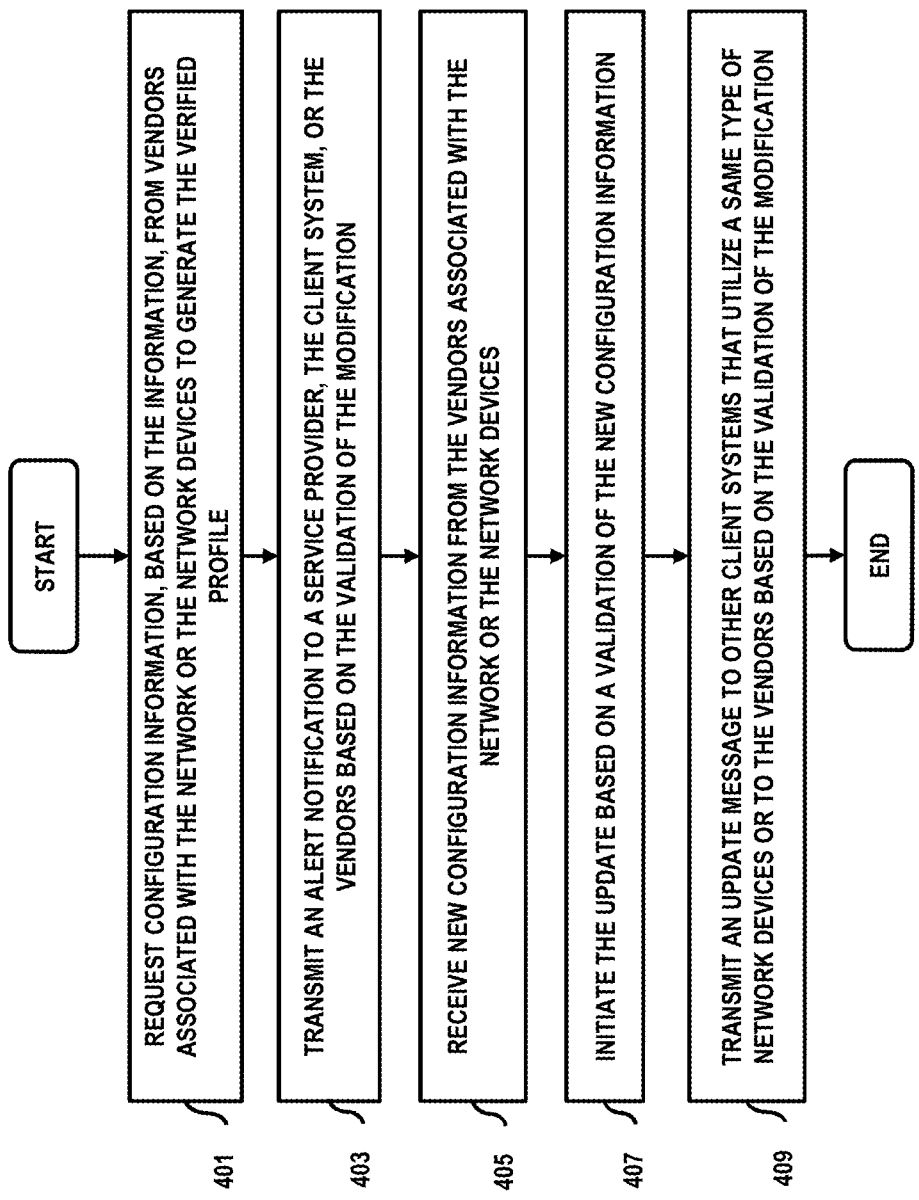

FIGS. 3 through 5 are flowcharts of processes for managing and verifying configuration of a client network and the network devices by assessing or sharing network/device information, according to various embodiments. It is noted that the steps of processes 300, 400, and 500 may be performed in any suitable order as well as combined or separated in any suitable manner. Further, all or portions of the steps or the processes may be initiated or completed by any of the components of the system 100; however, for clarity in discussing the processes, the CSM platform 111 is referred to as completing various steps of said processes, which may be performed in any suitable order and where one or more of the steps may be optional.

As shown in FIG. 3, the process 300 may begin at step 301 where the CSM platform may query a client system to determine one or more information items associated with a network and one or more network devices in the client system. In one embodiment, a service provider using a CSM platform may access a client system to determine information about the client system and possible network and network devices that may be associated with that system. In various scenarios, the query may be initiated based on a service request from the client, a service agreement between the service provider and the client, a request from a vendor that is associated with the client system, or the like. In various examples, the CSM platform may have direct access to each network device (e.g., servers, transmitters, receivers, etc.), or the CSM platform may have access to a point-of-contact (e.g., a server), which may include information about the network and the network devices in the client system. In one scenario, the information may include identification information, IP address, operating parameters, configuration information, system architecture specification, associated vendors, or the like about the network or the network devices. In one embodiment, the CSM platform may utilize one or more of the information items to determine additional information that may be available from one or more vendors or databases. Additionally, the one or more information items may indicate versions of the network devices and their software/hardware/firmware. In one embodiment, the CSM platform may store the collected or determined information at one or more local or remote storage devices, for example, the client database 121, the vendor database 123, or the like.

At step 303, the CSM platform may generate a verified profile for the network and the one or more network devices. In one example, a profile may include various configuration or architecture information associated with the client, system type, target use, networks, network devices, or the like. In one scenario, the CSM platform may determine, from the client system, configuration information for the networks and the network devices. Further, the CSM platform may request or determine additional configuration information from one or more vendors that may be associated with the networks and the network devices in the client system. In one embodiment, the CSM platform may utilize the configuration information from the client system, the additional configuration information from the vendors, and information specific to the client system (e.g., history, performance information, etc.) to generate a verified profile for the networks and the network devices. In one embodiment, the CSM platform may compare one or more configurations for the client system to generate the verified profile. In one example, the CSM platform may utilize a verified profile of a first client system to generate a verified profile for another client system, which may include the same or similar network, network devices, system architecture, etc. as that of the first client system. In one scenario, the verified profile for a client system may be stored at one or more local or remote storage devices.

At step 305, the CSM platform may analyze a modification in an active profile associated with the network and the one or more network devices. In one example, an active profile may include current configuration and parameters that are in use in a client system to effectuate performance of one or more networks and network devices in the system. In one scenario, an active profile may indicate scope of a network and a configuration profile for each of network devices within the network. In one embodiment, the CSM platform may monitor the client system and analyze any changes to the networks or the network devices. For instance, the CSM platform may determine that there are one or more modifications to the network coverage and to one or more software/hardware/firmware of one or more network devices in the client system. In various scenarios, the modifications may be done by a client, a user, an administrator, one or more vendors, etc. that are associated with the client system. For example, at a client system, an administrator may update a certain software on a server and client system, or a vendor may upgrade one or more modules at a satellite signal receiver, or a user may install a new application on a test equipment, or the like.

At step 307, the CSM platform may initiate an update to the verified profile or to the active profile based on a validation of the modification. In one embodiment, the CSM platform may analyze various system performance information items to determine the validity of the one or more modifications in the client system. In one example, the CSM platform may query the performance information from each network device for determining the impact of the one or more modifications in the client system. In one example, the CSM platform may analyze the performance of the entire client system to determine whether the one or more modifications have, positively/negatively, impacted the performance of the system. In one embodiment, the CSM platform may utilize external data to determine an impact on the performance of the client system. For instance, information about a coverage, signal strength, reliability, error rate, etc. of a cellular network may be determined from one or more user devices that are communicating with the cellular network. In one embodiment, the CSM platform may request or query for authorization information associated with each modification detected in the client system. For instance, to determine whether a patch to a system-level software was done by a client or a system administrator. In one embodiment, if the results of the analysis of the modifications indicate a beneficial/positive/expected impact to the client system, then the CSM platform may initiate an update to a verified profile associated with the client system. For example, an upgrade to a processor of an Internet router (e.g., wired or wireless) may cause a positive/expected impact of better throughput. However, if the results of the analysis of the modifications indicate a negative/unacceptable impact to the client system, then the CSM platform may initiate an update to a current active profile associated with the client system. For example, the CSM platform may utilize all or portions of a verified profile to update all or portions of an active profile in the client system. For instance, if an update to an application in the client system is causing a delay in encoding messages for transmission, then the CSM platform may update the current active profile to use the version of the application indicated in the verified profile. In one embodiment, the CSM platform and request for a confirmation, from a client or a vendor associated with the client system, before initiating an update to the verified or active profile.

In FIG. 4, the process 400 may begin at step 401 where the CSM platform may request configuration information, based on the one or more information items, from one or more vendors associated with the network, the one or more network devices, or a combination thereof to generate the verified profile. In one embodiment, the CSM platform may utilize one or more configurations, available from one or more vendors that are associated with one or more network devices in the client system, to generate the verified profile for the client system. For example, configurations available from vendors for a server, a cellular communications base station, an Internet router, etc. may be utilized in generating a verified profile for a client system that utilizes those network devices. In various embodiments, the CSM platform may automatically receive, access, or request the configuration information from vendors that are associated with a network or network devices in the client system.

At step 403, the CSM platform may transmit an alert notification to a service provider, the client system, the one or more vendors, or a combination thereof based on the validation of the modification. In one scenario, the CSM platform may initiate or cause a transmission of one or more notifications to one or more service providers, where the notifications may include information on the validity of a modification determined by the CSM platform. In one example, the notifications to the service providers may include one or more requests for the service providers to provide one or more services for the client system. In one use case scenario, a service provider may be requested to visit a communication base station in the client system to update or undo a recent update at the base station. In one scenario, an alert notification may be transmitted to the client system, wherein the client, a user, an administrator, or the like may interact with the alert notification. In another scenario, one or more alert notifications may be transmitted to one or more vendors who may be associated with one or more network devices in the client system. For instance, an alert notification indicating that a recent modification to a system server in the client system may be impacting several network devices that are from various vendors. In one embodiment, an alert notification may include details on specific network devices, overall client system performance, and impact of a modification at one network device on one or more other network devices.

At step 405, the CSM platform may receive new configuration information from the one or more vendors associated with the network, the one or more network devices, or a combination thereof. In one scenario, the CSM platform may receive information on a new configuration from a vendor of a network device, wherein the new configuration may be based on one or more modifications to software, hardware, firmware, etc. that the vendor may have implemented at the network device. In various examples, the CSM platform may access the new configuration information from a database accessible by both the CSM platform and the vendor, or the CSM platform may receive the new configuration information from/via the client system. In one example, the system platform may receive new configuration information on a plurality of network devices from one vendor, wherein the vendor may be associated with all of the plurality of network devices or with other vendors associated with at least one of the plurality of the network devices. In one embodiment, the CSM platform may receive a new configuration information via a service provider associated with a plurality of vendors. For example, the vendors of network devices may communicate their new configuration information to a service provider that, in turn, could provide the new configuration information to a CSM platform.

At step 407, the CSM platform may initiate the update based on a validation of the new configuration information. In one embodiment, the CSM platform may utilize various processes or algorithms to validate a new configuration for a client system. In some situations, the new configuration information may relate to a plurality of network devices or network parameters in a client system. In various embodiments, the validation of a new configuration may be on the client system and in real-time, on a test system similar to the client system, or in a simulation environment based on the client system, or the like. In one scenario, the CSM platform may compare performance information of all or portions of the client system under a new configuration to the performance information under a verified profile.

At step 409, the CSM platform may transmit an update message to one or more other client systems that utilize a same type of network devices as the one or more network devices, to the one or more vendors, or a combination thereof based on the validation of the modification. In one embodiment, a CSM platform may transmit an update message, which includes information about a validation of a modification for a first client system, to one or more other client systems that may utilize the same type of network devices as the first client system. For example, an update message including information about validated modification of software/hardware/firmware at a server in a first client system may be transmitted-to/shared-with one or more other client systems that utilize the same type of server. In one scenario, the update message may be transmitted-to/shared-with one or more vendors that may be associated with the same type of server. In one scenario, specific (e.g. proprietary) information about an update at a specific network device in a client system may be shared only with the vendor of that network device whereas general information about the update may be shared with other vendors associated with the client system.

Referring to FIG. 5, the process 500 may begin at step 501 where the CSM platform may compare configuration information associated with the client system to configuration information associated with the one or more other client systems. In one scenario where a service provider may utilize a CSM platform to provide services to one or more client systems, a plurality of configurations associated with a plurality of client systems may be compared. In one instance, various processes or algorithms may be utilized to analyze network and networked device information associated with each client system for comparison with other client systems. Further, detailed information about each network device may be stored at a local or remote storage device. In one example, the comparison may include analysis of configuration information of the plurality of networks, types of networks, types of users (e.g., public, private, corporate, secured, etc.), number or versions of network devices, location information, regulatory requirements, or the like.

At step 503, the CSM platform may determine performance data associated with the client system and the one or more other client systems. In one embodiment, the comparison results may include various performance data points associated with a plurality of client systems. In various scenarios, the performance data may be determined from data internal to a client system, from external sources utilizing the client systems, in various test systems similar to the plurality of client systems, or the like. For example, information about throughputs of communication messages in various client systems may be compared while taking into consideration similarities or differences in the various client systems (e.g., network architecture, network devices, use type, etc.) In another example, the CSM platform may utilize various software or algorithms to determine one or more causes for differences in the client systems, for example, which may be due to differences in specific hardware/software/firmware in various network devices in the various client systems.

At step 505, the CSM platform may transmit results of the comparison and the performance data to the one or more vendors. In one embodiment, the CSM platform may determine and transmit specific results of specific network devices in a client system to one or more vendors that may be associated with one or more network devices in the client system. In one example, the results of the comparison may be stored at the vendor database 123 where one or more vendors may be able to access information that may be specific to a given vendor or general information associated with various networks and network devices. In one instance, information about network architecture of a client system may also be made available to the vendors.

At step 507, the CSM platform may determine functional compatibilities between the one or more network devices and one or more new network devices in the network. In one use case scenario, a client or a CSM platform may initiate an integration of one or more new network devices into a client system, for example, to modify one or more functionalities in decline system. For example, to expand available services, increase capability to serve additional users, etc. In one scenario, the CSM platform may request, receive, access, or determine one or more information items related to a new network device that is to be added to a network in the client system. Additionally, the CSM platform may determine and compare functional compatibilities between the new network device and the existing network devices in the client system. In one embodiment, the CSM platform may access information about the new and existing network devices from their respective vendors. In one example, the information may be determined from the client database 121 or the vendor database 123. In one scenario, information about functional compatibilities of a plurality of network devices may be received/requested from one vendor, which is associated with at least one network device. For example, a certain vendor of a network device may evaluate performance or functional compatibilities between the network device and one or more other network devices from one or more other vendors.

At step 509, the CSM platform may initiate the update based on the compatibilities. In one embodiment, a CSM platform may initiate an update to a verified profile of a client system based on determining of the compatibility information associated with a new device and existing devices in a client system. For example, once it's determined that a new device is compatible with the network and the existing network devices, the CSM platform may initiate updating a verified profile or an active profile associated with the client system.

At step 511, the CSM platform may generate a client system profile history based on the validation of the modification associated with the verified profile, the active profile, or a combination thereof. In one embodiment, a CSM platform may utilize information associated with one or more validations of one or more modifications in a client system to generate a client system profile history. In one scenario, a client system profile history may include information about prior and current verified and active profiles associated with the client system. In one example, a profile history may include information about validated as well as invalidated modifications, which may be associated with various network devices were network parameters in a client system.

FIGS. 6A through 6E illustrate example client system profile information associated with the processes in FIGS. 3 through 5, according to various embodiments.

Figure 6A:
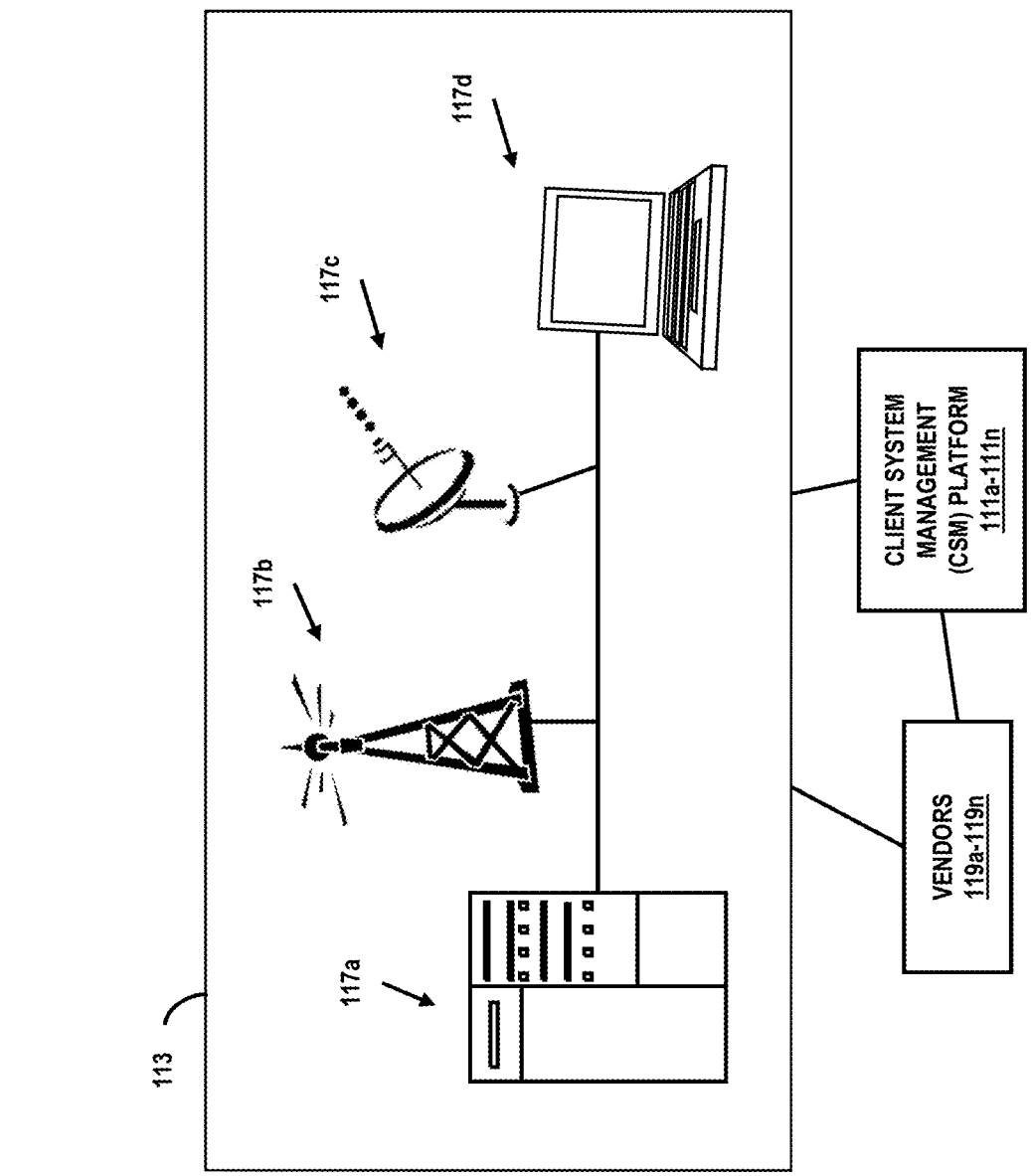
FIGS. 6A through 6E illustrate example client system profile information associated with the processes in FIGS. 3 through 5, according to various embodiments.

FIG. 6A includes diagram 600 depicting various network devices 117a-117d associated with a client system 113, CSM platform 111, and vendors 119. For instance, the devices may include a network server 117a, a communications base-station 117b for transmitting/receiving radio signals, a satellite dish 117c for transmitting/receiving satellite signals (e.g., data), and a personal computer 117d for connecting with a network in the client system 113. In this example, the CSM platform may communicate with any of the client system 113 or the vendors 119 to determine one or more information items associated with the network devices or a network in the client system 113. In various examples, the CSM platform may have direct access to each network device or to a point-of-contact device (e.g., server 117*a*) that may access and provide information on the network and the network devices in the client system 113. In one example, the CSM platform may request and receive the information about the network and the network devices from one or more vendors that may have provided (e.g., sold, leased, installed, etc.) components, elements, or devices for the client system 113.

Figure 6B:
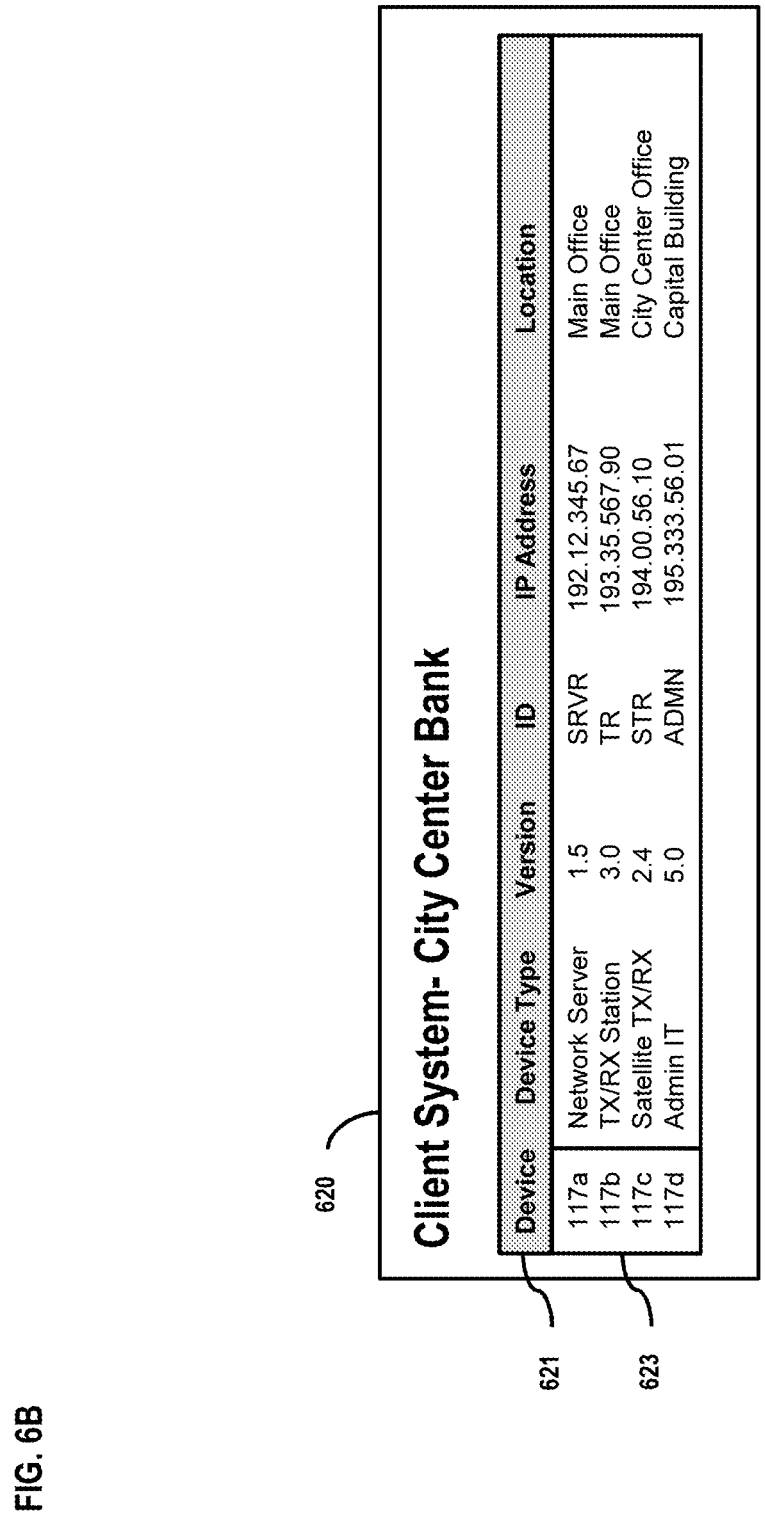

FIG. 6B illustrates information 620 about the client system 113 and its network or network devices 117*a*-117*d*. In one scenario, the CSM platform may query the client system for the information 621; for example, device, client, device type, ID, IP address, location, or the like. In one example, some of information items 623 may be determined from one or more vendors or vendor databases associated with the client system or with the network devices in the client system. For example, the CSM may provide an IP address, a serial number, or the like identification information to a vendor and the vendor may provide additional related information such as version, device type, or the like. In one scenario, the information items may be at a system level related to a network device as well as information about individual software, hardware, or firmware of that network device.

Figure 6C:
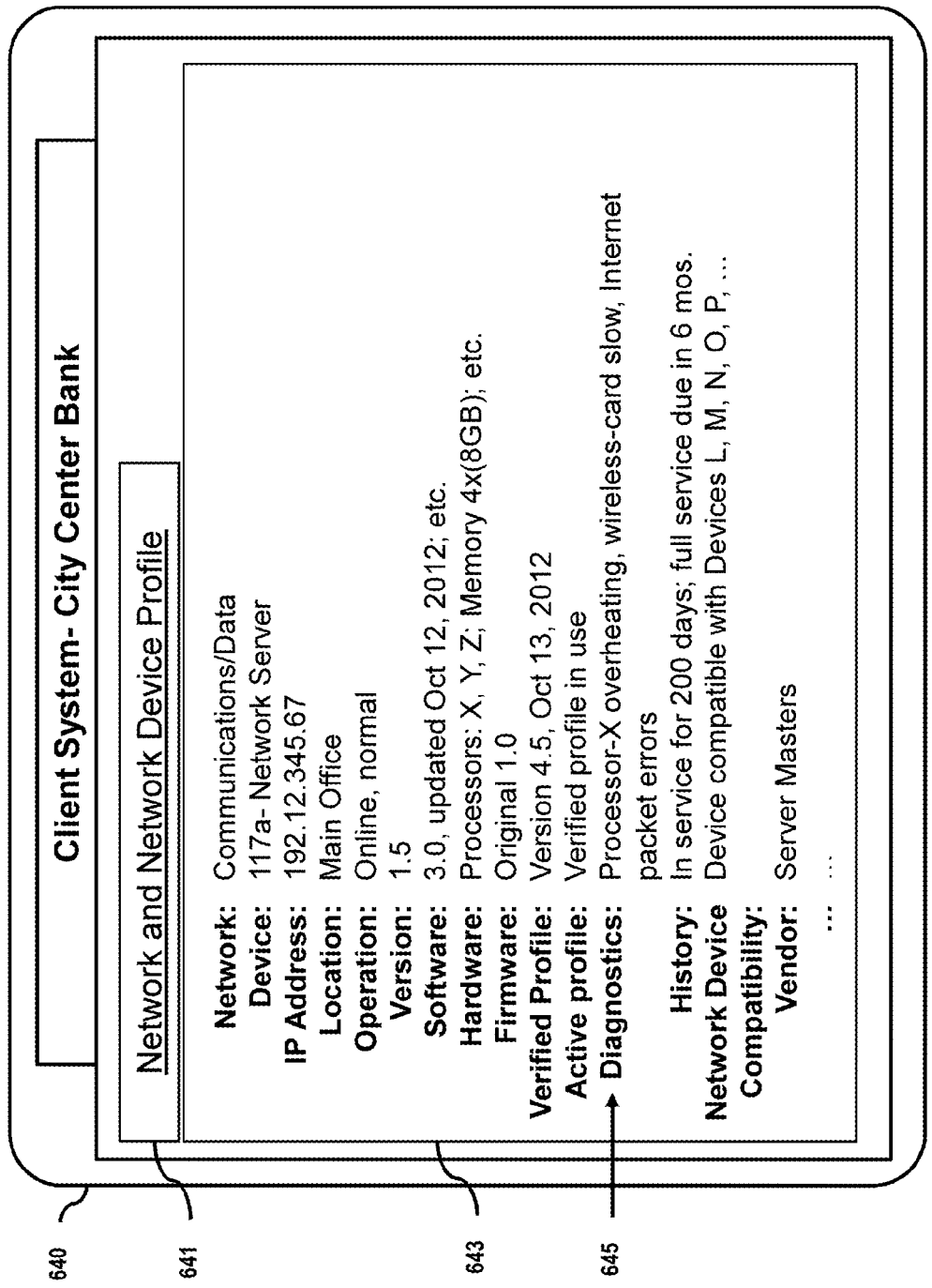

FIG. 6C illustrates profile or a database entry 640 of information associated a network device, e.g., 117*a*, in a client system 113. In one scenario, network and network device information 641 may include information 643 with details on Network, Device, IP Address, Location, Operation, Version, Software, Hardware, Firmware, Verified Profile, Active profile, Diagnostics, History, Network Device Compatibility, Vendor, etc. In one example, the diagnostics may present information on various device components, elements, functionality, or the like. In this example, the diagnostics 645 indicate that a Processor-X is overheating, functionality at a wireless-card is slower than normal, and there errors in Internet packets begin communicated via the device 117*a*. Further, the information 643 indicates that the verified profile is at version 4.5 that was verified on Oct. 13, 2012 and that verified profile is in active use.

Figure 6D:
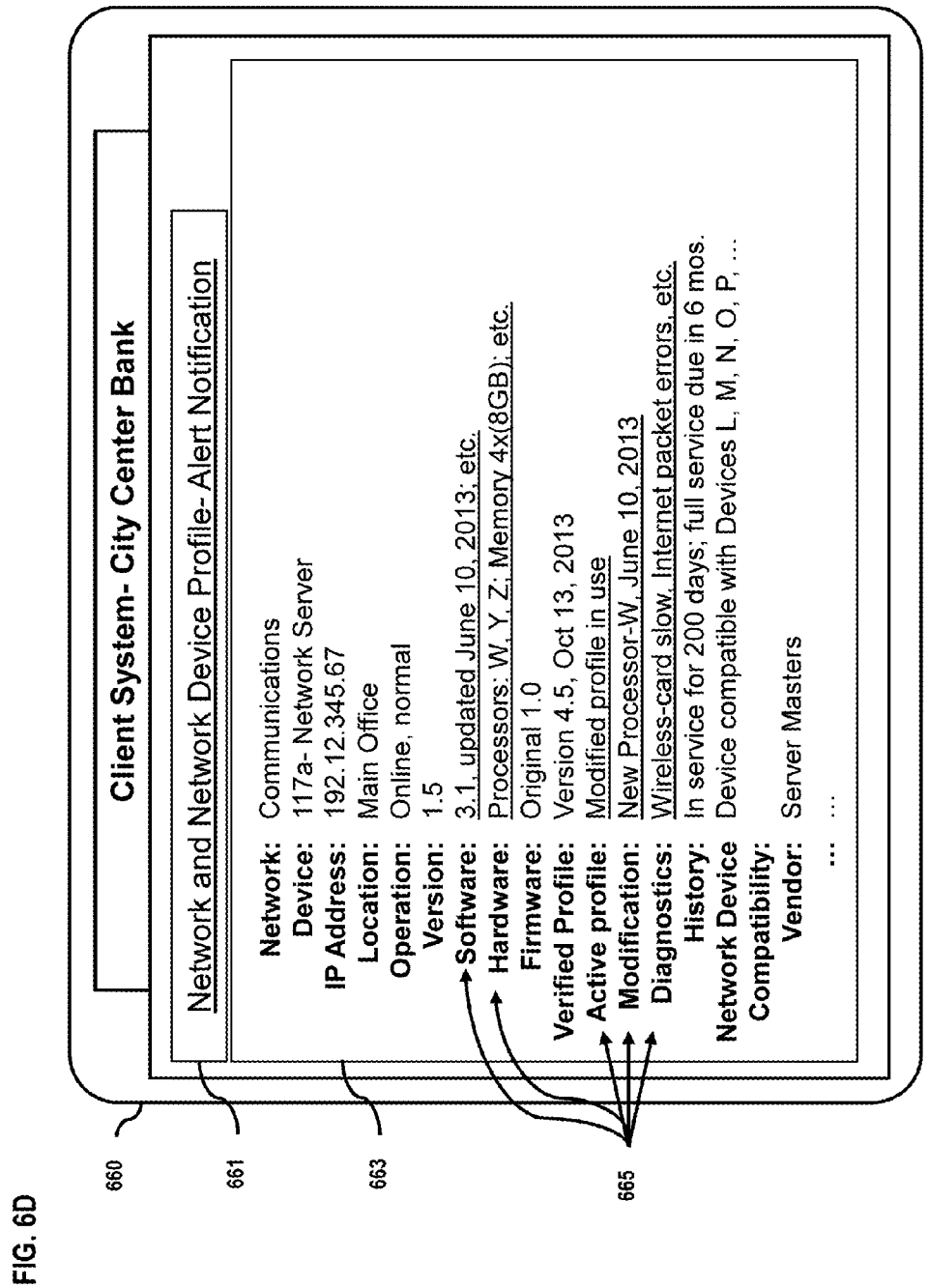

FIG. 6D illustrates profile or a database entry 660 including an alert notification 661, which may be transmitted/communicated to a service provider, the client system, the one or more vendors, or an entity in the system 100 that may be associated with the client system 113. In this example, information items 663 indicate one or more modifications 665, wherein the software, active profile, modification, and the diagnostics fields indicates changes to the respective items in the device 117*a*. For instance, the changes indicate that the software was updated to 3.1 on Jun. 10, 2013; processor X is swapped out with a processor W on Jun. 10, 2013; the active profile is a "modified profile" in use; update to the diagnostics (e.g., issue with processor X is taken out).

Figure 6E:
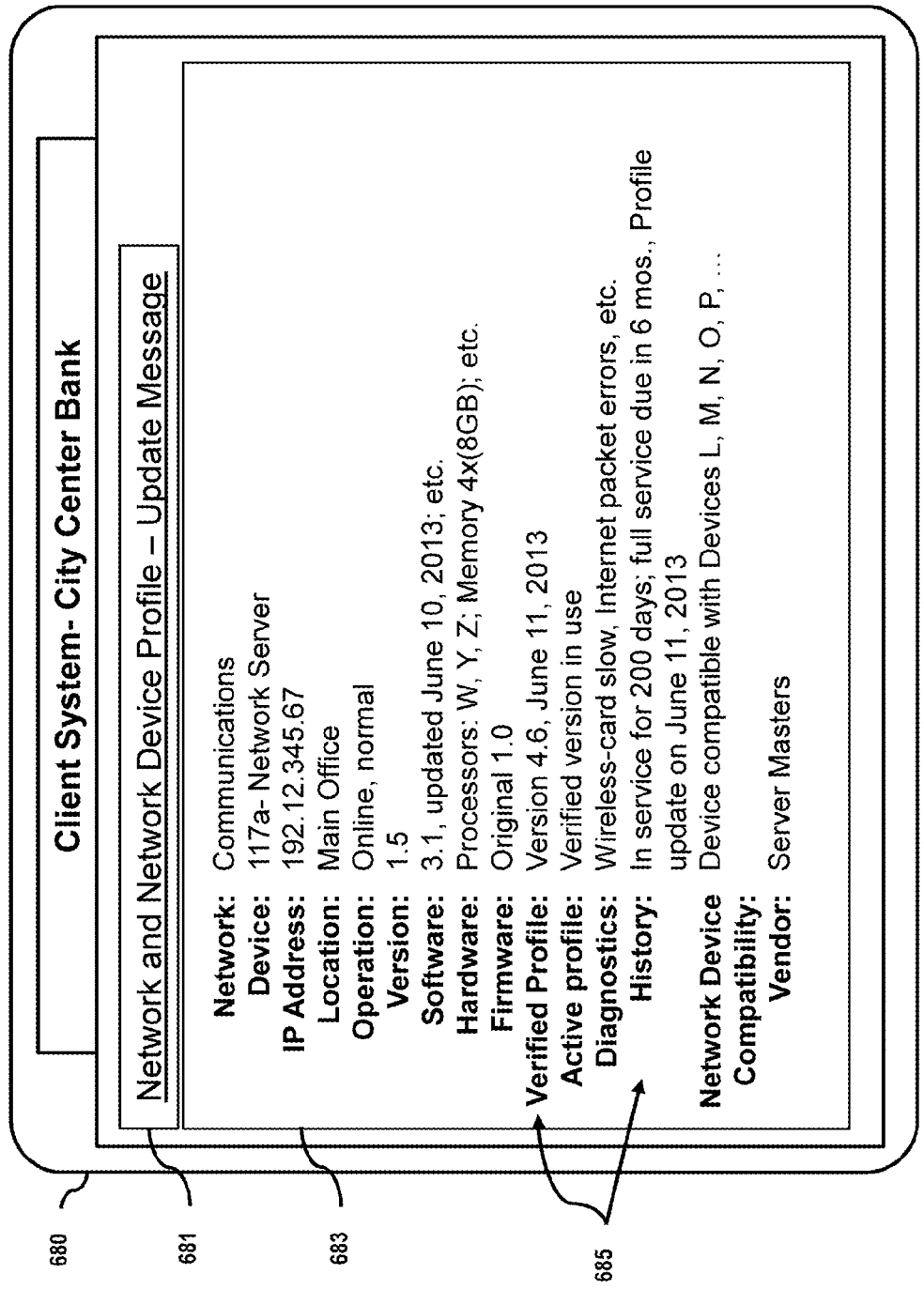

FIG. 6E illustrates profile or a database entry 680 including an update message 681, which may be transmitted/communicated to a service provider, the client system, one or more other client systems, the one or more vendors, or an entity in the system 100 that may be associated with the client system 113. In one scenario, information items 683 may include one or more portions of the profile 680, wherein the portions transmitted may be based on a recipient of the profile information. For example, proprietary information may be only communicated to the original client system and vendor(s) associated with the device 117*a* or with the client system 113. In one example, the information items 683 may include specific information such as 685 to indicate information on a verified profile or history of the device 117*a*.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The processes described herein for facilitating a CSM platform may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
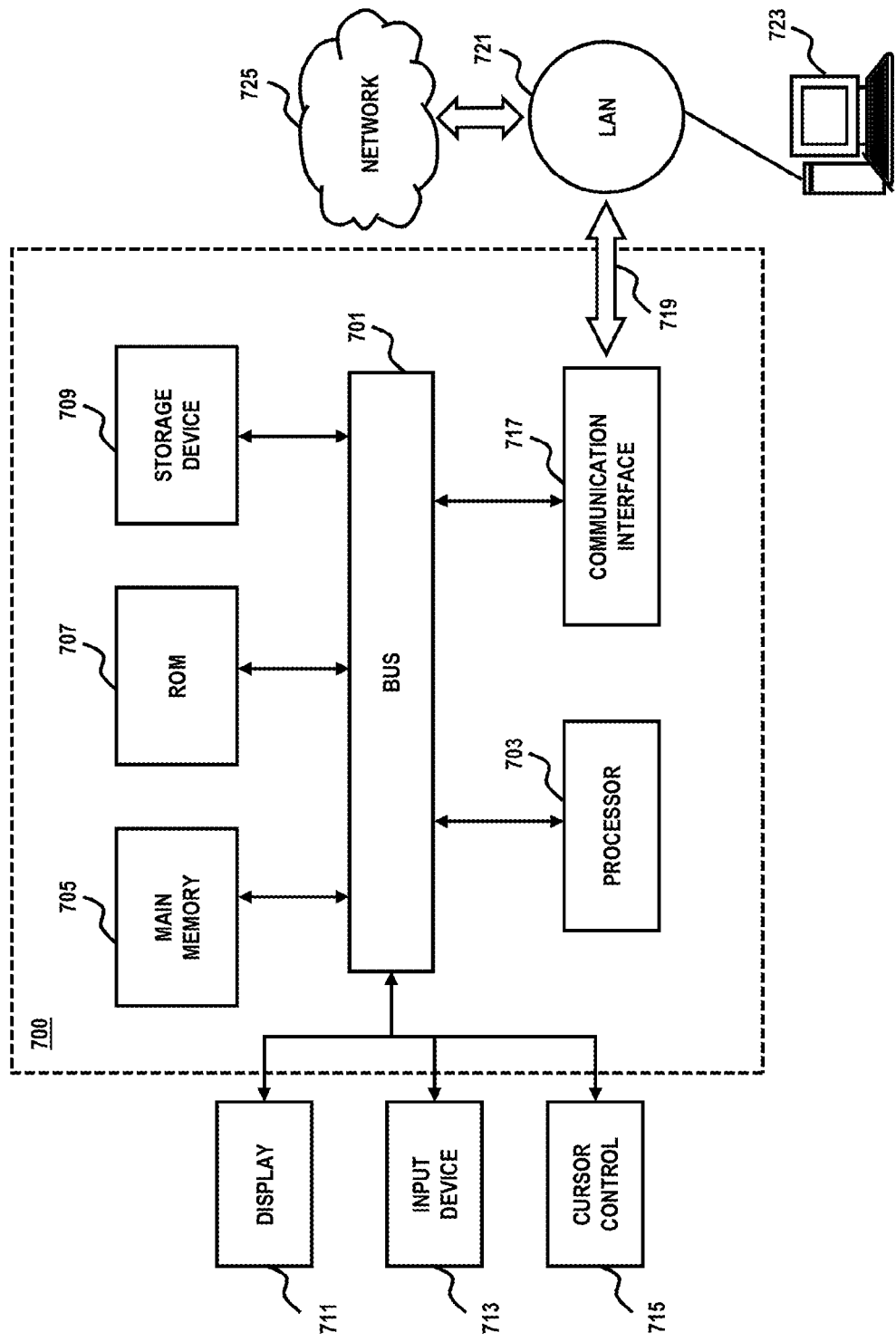
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multiprocessing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
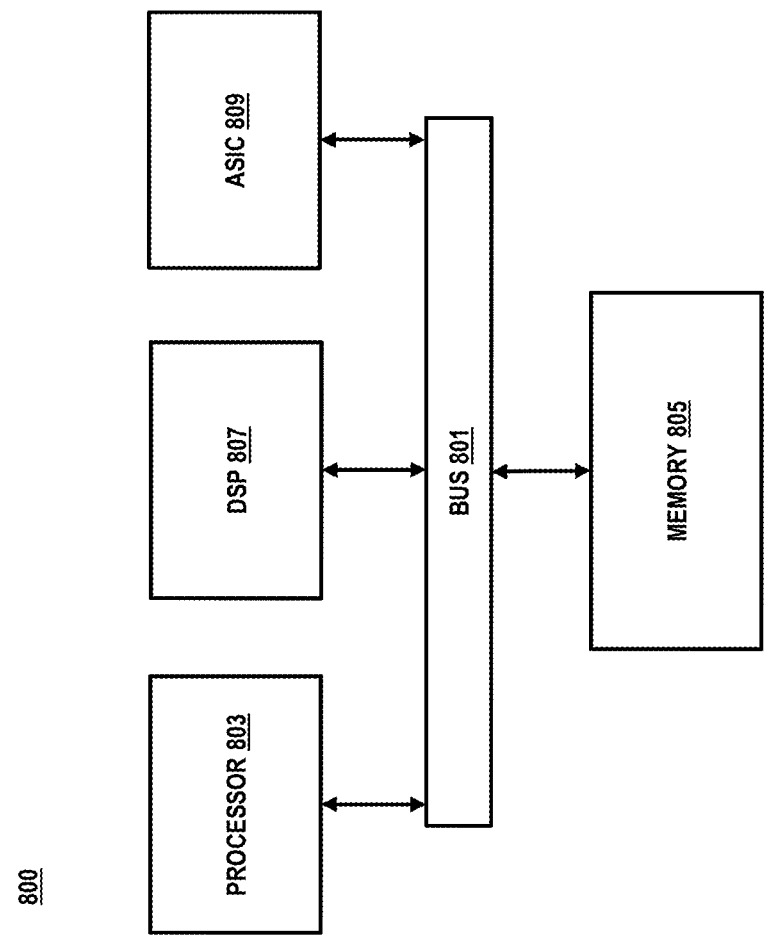
FIG. 8 is a diagram of a chip set that can be used to implement an embodiment of the invention.

FIG. 8 illustrates a chip set 800 upon which an embodiment of the invention may be implemented. Chip set 800 is programmed to provide support for managing and verifying configuration of a client network and the network devices by assessing or sharing network/device information includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 3 through 5.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method, comprising:
   querying a client system to determine one or more information items associated with a network and one or more network devices in the client system;
   requesting configuration information, based on the one or more information items, from one or more vendors associated with the network, the one or more network devices, or a combination thereof;
   receiving the requested configuration information;
   generating, based on the received configuration information, a verified profile for the network and the one or more network devices;
   analyzing a modification in an active profile associated with the network and the one or more network devices;
   initiating an update to the verified profile or to the active profile based on a validation of the modification; and
   transmitting an update message to one or more other client systems that utilize a same type of network devices as the one or more network devices, to the one or more vendors, or a combination thereof based on the validation of the modification.

2. The method of claim 1, further comprising:
   comparing configuration information associated with the client system to configuration information associated with the one or more other client systems;
   determining performance data associated with the client system and the one or more other client systems; and
   transmitting results of the comparison and the performance data to the one or more vendors.

3. The method of claim 1, further comprising:
   transmitting an alert notification to a service provider, the client system, the one or more vendors, or a combination thereof based on the validation of the modification.

4. The method of claim 1, further comprising:
   generating a client system profile history based on the validation of the modification associated with the verified profile, the active profile, or a combination thereof.

5. A method, comprising:
   querying a client system to determine one or more information items associated with a network and one or more network devices in the client system;
   generating a verified profile for the network and the one or more network devices;
   analyzing a modification in an active profile associated with the network and the one or more network devices;
   determining functional compatibilities between the one or more network devices and one or more new network devices in the network; and
   initiating, based on the determined functional compatibilities, an update to the verified profile or to the active profile based on a validation of the modification.

6. The method of claim 5, further comprising:
   requesting configuration information, based on the one or more information items, from one or more vendors associated with the network, the one or more network devices, or a combination thereof to generate the verified profile.

7. The method of claim 6, further comprising:
   transmitting an alert notification to a service provider, the client system, the one or more vendors, or a combination thereof based on the validation of the modification.

8. The method of claim 6, further comprising:
   receiving new configuration information from the one or more vendors associated with the network, the one or more network devices, or a combination thereof; and
   initiating the update based on a validation of the new configuration information.

9. The method of claim 5, further comprising:
   generating a client system profile history based on the validation of the modification associated with the verified profile, the active profile, or a combination thereof.

10. An apparatus, comprising:
    a processor; and
    a memory including computer program code for one or more programs, the memory and the computer program code configured to, with the processor, cause the apparatus to perform at least the following:
      query a client system to determine one or more information items associated with a network and one or more network devices in the client system;
      request configuration information, based on the one or more information items, from one or more vendors associated with the network, the one or more network devices, or a combination thereof to generate the verified profile;
      receive the requested configuration information;
      generate, based on the configuration information, a verified profile for the network and the one or more network devices;
      analyze a modification in an active profile associated with the network and the one or more network devices;
      initiate an update to the verified profile or to the active profile based on a validation of the modification; and
      transmit an update message to one or more other client systems that utilize a same type of network devices as the one or more network devices, to the one or more vendors, or a combination thereof based on the validation of the modification.

11. The apparatus of claim 10, wherein the apparatus is further caused to:
    compare configuration information associated with the client system to configuration information associated with the one or more other client systems;
    determine performance data associated with the client system and the one or more other client systems; and
    transmit results of the comparison and the performance data to the one or more vendors.

12. The apparatus of claim 10, wherein the apparatus is further caused to:
    transmit an alert notification to a service provider, the client system, the one or more vendors, or a combination thereof based on the validation of the modification.

13. An apparatus, comprising:
    a processor; and
    a memory including computer program code for one or more programs, the memory and the computer program code configured to, with the processor, cause the apparatus to perform at least the following:
        query a client system to determine one or more information items associated with a network and one or more network devices in the client system;
        generate a verified profile for the network and the one or more network devices:
        analyze a modification in an active profile associated with the network and the one or more network devices;
        determine functional compatibilities between the one or more network devices and one or more new network devices in the client system; and
        initiate, based on the functional capabilities, an update to the verified profile or to the active profile based on a validation of the modification.

14. The apparatus of claim 13, wherein the apparatus is further caused to:
    request configuration information, based on the one or more information items, from one or more vendors associated with the network, the one or more network devices, or a combination thereof to generate the verified profile.

15. The apparatus of claim 14, wherein the apparatus is further caused to:
    transmit an alert notification to a service provider, the client system, the one or more vendors, or a combination thereof based on the validation of the modification.

16. The apparatus of claim 14, wherein the apparatus is further caused to:
    receive new configuration information from the one or more vendors associated with the network, the one or more network devices, or a combination thereof; and
    initiate the update based on a validation of the new configuration information.

17. The apparatus of claim 13, wherein the apparatus is further caused to:
    generate a client system profile history based on the validation of the modification associated with the verified profile, the active profile, or a combination thereof.

18. A non-transitory computer-readable medium storing a set of processor-executable instructions, wherein execution of the processor-executable instructions, by one or more processors of a customer system management platform, cause the one or more processors to:
    query a client system to determine one or more information items associated with a network and one or more network devices in the client system;
    generate a verified profile for the network and the one or more network devices,
    analyze a modification in an active profile associated with the network and the one or more network devices;
    initiate an update to the verified profile or to the active profile based on a validation of the modification; and
    transmit an update message to one or more other client systems that utilize a same type of network devices as the one or more network devices, to the one or more vendors, or a combination thereof based on the validation of the modification.

19. The non-transitory computer-readable medium of claim 18, wherein execution of the processor-executable instructions further causes the one or more processors to:
    request configuration information, based on the one or more information items, from one or more vendors associated with the network, the one or more network devices, or a combination thereof to generate the verified profile.

20. The non-transitory computer-readable medium of claim 19, wherein execution of the processor-executable instructions further causes the one or more processors to:
    receive new configuration information from the one or more vendors associated with the network, the one or more network devices, or a combination thereof; and
    initiate the update based on a validation of the new configuration information.

* * * * *